(12) United States Patent
Oguro et al.

(10) Patent No.: US 11,970,162 B2
(45) Date of Patent: Apr. 30, 2024

(54) VEHICLE CONTROL DEVICE, VEHICLE CONTROL METHOD, AND PROGRAM

(71) Applicant: HONDA MOTOR CO., LTD., Tokyo (JP)

(72) Inventors: Hiroshi Oguro, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/269,600

(22) PCT Filed: Dec. 28, 2020

(86) PCT No.: PCT/JP2020/049132
§ 371 (c)(1),
(2) Date: Jun. 26, 2023

(87) PCT Pub. No.: WO2022/144970
PCT Pub. Date: Jul. 7, 2022

(65) Prior Publication Data
US 2023/0391321 A1    Dec. 7, 2023

(51) Int. Cl.
*B60W 60/00*      (2020.01)
*B60W 30/09*      (2012.01)
*B60W 30/095*      (2012.01)

(52) U.S. Cl.
CPC ........ *B60W 30/09* (2013.01); *B60W 30/0956* (2013.01); *B60W 60/0053* (2020.02);
(Continued)

(58) Field of Classification Search
CPC ............. B60W 30/09; B60W 30/0956; B60W 60/0053; B60W 2554/80; B60W 2554/801; B60W 2554/802
See application file for complete search history.

(56) References Cited

U.S. PATENT DOCUMENTS

| 2009/0248270 A1 | 10/2009 | Sekiguchi |
| 2015/0142292 A1 | 5/2015 | Kastner et al. |

(Continued)

FOREIGN PATENT DOCUMENTS

| CN | 107310554 | 11/2017 |
| CN | 108698609 | 10/2018 |

(Continued)

OTHER PUBLICATIONS

International Search Report and Written Opinion for International Application No. PCT/JP2020/049132 datedn Mar. 23, 2021, 8 pages.

(Continued)

*Primary Examiner* — Anshul Sood
(74) *Attorney, Agent, or Firm* — Amin, Turocy & Watson, LLP (57) ABSTRACT

Provided is a vehicle control device including: a recognizer that recognizes a surrounding situation of a vehicle, and identifies an interrupting vehicle trying to cut in a lane of the vehicle; a driving controller that controls steering and acceleration/deceleration of the vehicle without depending on an operation of the vehicle by a driver; and a mode determiner that determines a driving mode of the vehicle as one of a plurality of driving modes including a first driving mode and a second driving mode, wherein the second driving mode is a driving mode imposing a lighter task on the driver than the first driving mode, and a part of the plurality of driving modes including at least the second driving mode is controlled by the driving controller, and wherein the mode determiner restricts execution of the second driving mode when a relationship between the vehicle and the interrupting vehicle satisfies a predetermined condition.

12 Claims, 7 Drawing Sheets

(52) U.S. Cl.
CPC ..... *B60W 2552/53* (2020.02); *B60W 2554/80* (2020.02); *B60W 2554/801* (2020.02); *B60W 2554/802* (2020.02)

(56) References Cited

U.S. PATENT DOCUMENTS

| | | | |
|---|---|---|---|
| 2016/0339914 A1* | 11/2016 | Habu | B60W 30/165 |
| 2017/0305422 A1 | 10/2017 | Ito et al. | |
| 2017/0313309 A1 | 11/2017 | Morales Teraoka | |
| 2018/0201275 A1 | 7/2018 | Tsuji | |
| 2018/0297590 A1 | 10/2018 | Kang et al. | |
| 2019/0039626 A1 | 2/2019 | Hatano | |
| 2019/0118832 A1 | 4/2019 | Mimura et al. | |
| 2019/0227544 A1 | 7/2019 | Aoki et al. | |
| 2019/0241184 A1* | 8/2019 | Hayashi | G05D 1/0212 |
| 2019/0286130 A1 | 9/2019 | Tsuchiya et al. | |
| 2019/0382020 A1 | 12/2019 | Niibo et al. | |
| 2020/0043254 A1 | 2/2020 | Hase et al. | |
| 2020/0307570 A1 | 10/2020 | Yoda et al. | |
| 2020/0307571 A1 | 10/2020 | Yoda et al. | |
| 2020/0307582 A1 | 10/2020 | Sato | |
| 2020/0307637 A1 | 10/2020 | Oguro et al. | |
| 2021/0107482 A1* | 4/2021 | Uematsu | B60W 30/16 |
| 2021/0309262 A1* | 10/2021 | Sugano | B60W 60/0051 |

FOREIGN PATENT DOCUMENTS

| | | |
|---|---|---|
| CN | 110077401 | 8/2019 |
| CN | 110281941 | 9/2019 |
| CN | 110609541 | 12/2019 |
| CN | 111746531 | 10/2020 |
| DE | 102009014587 B4 | 9/2016 |
| DE | 102017206745 A1 | 11/2017 |
| DE | 112016003493 T5 | 4/2018 |
| DE | 112016006760 T5 | 1/2019 |
| DE | 102020100343 B4 | 1/2023 |
| JP | 11-001133 | 1/1999 |
| JP | 2017-196973 | 11/2017 |
| JP | 2017-207907 | 11/2017 |
| JP | 2018-180843 | 11/2018 |
| JP | 2019-119310 | 7/2019 |
| JP | 2019-217825 | 12/2019 |
| JP | 2020-158077 | 10/2020 |
| JP | 2020-163867 | 10/2020 |
| JP | 2020-163870 | 10/2020 |
| WO | 2014/006770 | 1/2014 |
| WO | 2019/131120 | 7/2019 |

OTHER PUBLICATIONS

Japanese Office Action for Japanese Patent Application No. 2021-576845 dated Apr. 12, 2022.
Japanese Decision to Grant a Patent for Japanese Patent Application No. 2021-576845 dated Aug. 16, 2022.
Chinese Office Action for Chinese Patent Application No. 202080108189.X dated Nov. 18, 2023.
German Office Action for German Patent Application No. 112020007735.7 mailed Feb. 1, 2024.

* cited by examiner

| DRIVING MODE | CONTROL STATE | TASK |
|---|---|---|
| MODE A | AUTOMATIC DRIVING | MONITORING OF FRONT FIELD:UNNECESSARY GRASP OF STEERING WHEEL:UNNECESSARY |
| MODE B | DRIVING ASSISTANCE | MONITORING OF FRONT FIELD:NECESSARY GRASP OF STEERING WHEEL:UNNECESSARY |
| MODE C | DRIVING ASSISTANCE | MONITORING OF FRONT FIELD:NECESSARY GRASP OF STEERING WHEEL:NECESSARY |
| MODE D | DRIVING ASSISTANCE | MONITORING OF FRONT FIELD:NECESSARY AT LEAST SOME DRIVING OPERATION IS REQUIRED |
| MODE E | MANUAL DRIVING | MONITORING OF FRONT FIELD:NECESSARY DRIVING OPERATION IS REQUIRED FOR BOTH OF STEERING AND ACCELERATION/DECELERATION |

↑ TASK:LIGHTER

↓ TASK:HEAVIER

VEHICLE CONTROL DEVICE, VEHICLE CONTROL METHOD, AND PROGRAM

TECHNICAL FIELD

The present invention relates to a vehicle control device, a vehicle control method, and a program.

BACKGROUND ART

The technology of detecting an autonomous driving vehicle approaching a subject vehicle and controlling the subject vehicle so as to avoid collision with the autonomous driving vehicle. For example, Patent Literature 1 discloses the technology of changing an inter-vehicle distance for collision avoidance depending on whether the autonomous driving vehicle approaching the subject vehicle is in an appropriate autonomous driving state (Patent Literature 1).

CITATION LIST

Patent Literature

[Patent Literature 1]
Japanese Patent Application Laid-open No. 2019-119310

SUMMARY OF INVENTION

Technical Issue

However, another vehicle existing near the subject vehicle are not necessarily autonomous driving vehicles, and thus various kinds of situations occur. As a result, in some cases, the related art cannot perform appropriate control according to the situation of the subject vehicle at a time when another vehicle cuts in the lane of the subject vehicle.

The present invention has been made in view of the above-mentioned circumstances, and has an object to provide a vehicle control device, a vehicle control method, and a program that are capable of performing appropriate control according to the situation of a subject vehicle at a time when another vehicle cuts in the lane of the subject vehicle.

Solution to Solve the Issue

A vehicle control device according to the present invention adopts the following configuration.

(1): According to one aspect of the present invention, there is provided a vehicle control device including: a recognizer that recognizes a surrounding situation of a vehicle, and identifies an interrupting vehicle trying to cut in a lane of the vehicle; a driving controller that controls steering and acceleration/deceleration of the vehicle without depending on an operation of the vehicle by a driver; and a mode determiner that determines a driving mode of the vehicle as one of a plurality of driving modes including a first driving mode and a second driving mode, in which the second driving mode is a driving mode imposing a lighter task on the driver than the first driving mode, and a part of the plurality of driving modes including at least the second driving mode is controlled by the driving controller, and in which the mode determiner restricts execution of the second driving mode when a relationship between the vehicle and the interrupting vehicle satisfies a predetermined condition.

(2): In the aspect (1), the second driving mode is a driving mode in which the driver is not required to perform a task of grasping a controller for receiving a steering operation, and the first driving mode is a driving mode in which the driver is required to perform a driving operation for at least one of steering and acceleration/deceleration of the vehicle.

(3): In the aspect (1), the second driving mode is a driving mode in which the driver is not required to perform a task of grasping a controller for receiving a steering operation, and the first driving mode is a driving mode in which the driver is required to perform at least the task of grasping the controller for receiving a steering operation.

(4): In the aspect (1), the first driving mode is a driving mode in which the driver is required to perform a task of monitoring the surrounding situation of the vehicle, and the second driving mode is a driving mode in which the driver is not required to perform the task of monitoring the surrounding situation of the vehicle.

(5): In the aspect (1), the recognizer changes a backward distance and a lateral distance to be monitored between the surrounding situation recognized for traveling of the vehicle and the surrounding situation recognized for identifying the interrupting vehicle.

(6): In the aspect (1), the predetermined condition includes a condition that a time to collision between the vehicle and a preceding vehicle is equal to or shorter than a first threshold value.

(7): In the aspect (1), the predetermined condition includes a condition that a time to collision between the vehicle and the interrupting vehicle is equal to or shorter than a first threshold value, and a distance between a center of the lane and a center of the interrupting vehicle is equal to or smaller than a second threshold value.

(8): In the aspect (1), the predetermined condition includes a condition that at least one of the following is satisfied: a forward distance between the vehicle and the interrupting vehicle is equal to or smaller than a third threshold value; a backward distance between the vehicle and the interrupting vehicle is equal to or smaller than a fourth threshold value; and a lateral distance between the vehicle and the interrupting vehicle is equal to or smaller than a fifth threshold value.

(9): In the aspect (1), the predetermined condition includes a condition that at least one of the following is satisfied: a forward distance between the vehicle and the interrupting vehicle is equal to or smaller than a third threshold value; a backward distance between the vehicle and the interrupting vehicle is equal to or smaller than a fourth threshold value; and a lateral distance between the vehicle and the interrupting vehicle is equal to or smaller than a sixth threshold value, the sixth threshold value being set to exceed a road marking line of the lane and reach an adjacent lane.

(10): In the aspect (1), the mode determiner increases the fifth threshold value as a speed of the vehicle becomes larger.

(11): In the aspect (1), the mode determiner increases the sixth threshold value as a speed of the vehicle becomes larger.

(12): In the aspect (10) or (11), the mode determiner increases the third threshold value or the fourth threshold value as the speed of the vehicle becomes larger.

(13): According to another aspect of the present invention, there is provided a vehicle control method to be executed by a computer mounted in a vehicle, the vehicle control method including: recognizing a surrounding situation of a vehicle, and identifying an interrupting vehicle trying to cut in a lane of the vehicle; controlling steering and acceleration/deceleration of the vehicle without depending on an operation of the vehicle by a driver; and determining a driving mode of the vehicle as one of a plurality of driving modes including a first driving mode and a second driving mode, in which the second driving mode is a driving mode imposing a lighter task on the driver than the first driving mode, and a part of the plurality of driving modes including at least the second driving mode is controlled by the controlling, and in which the vehicle control method further comprises restricting execution of the second driving mode when a relationship between the vehicle and the interrupting vehicle satisfies a predetermined condition.

(14): According to another aspect of the present invention, there is provided a program for causing a computer mounted in a vehicle to execute: recognizing a surrounding situation of a vehicle, and identifying an interrupting vehicle trying to cut in a lane of the vehicle; controlling steering and acceleration/deceleration of the vehicle without depending on an operation of the vehicle by a driver; and determining a driving mode of the vehicle as one of a plurality of driving modes including a first driving mode and a second driving mode, in which the second driving mode is a driving mode imposing a lighter task on the driver than the first driving mode, and a part of the plurality of driving modes including at least the second driving mode is controlled by the controlling, and in which the program further causes the computer to execute restricting execution of the second driving mode when a relationship between the vehicle and the interrupting vehicle satisfies a predetermined condition.

DESCRIPTION OF EMBODIMENTS

Now, referring to the drawings, description is given of a vehicle control device, a vehicle control method, and a program according to the present invention.

[Overall Configuration]

Figure 1:
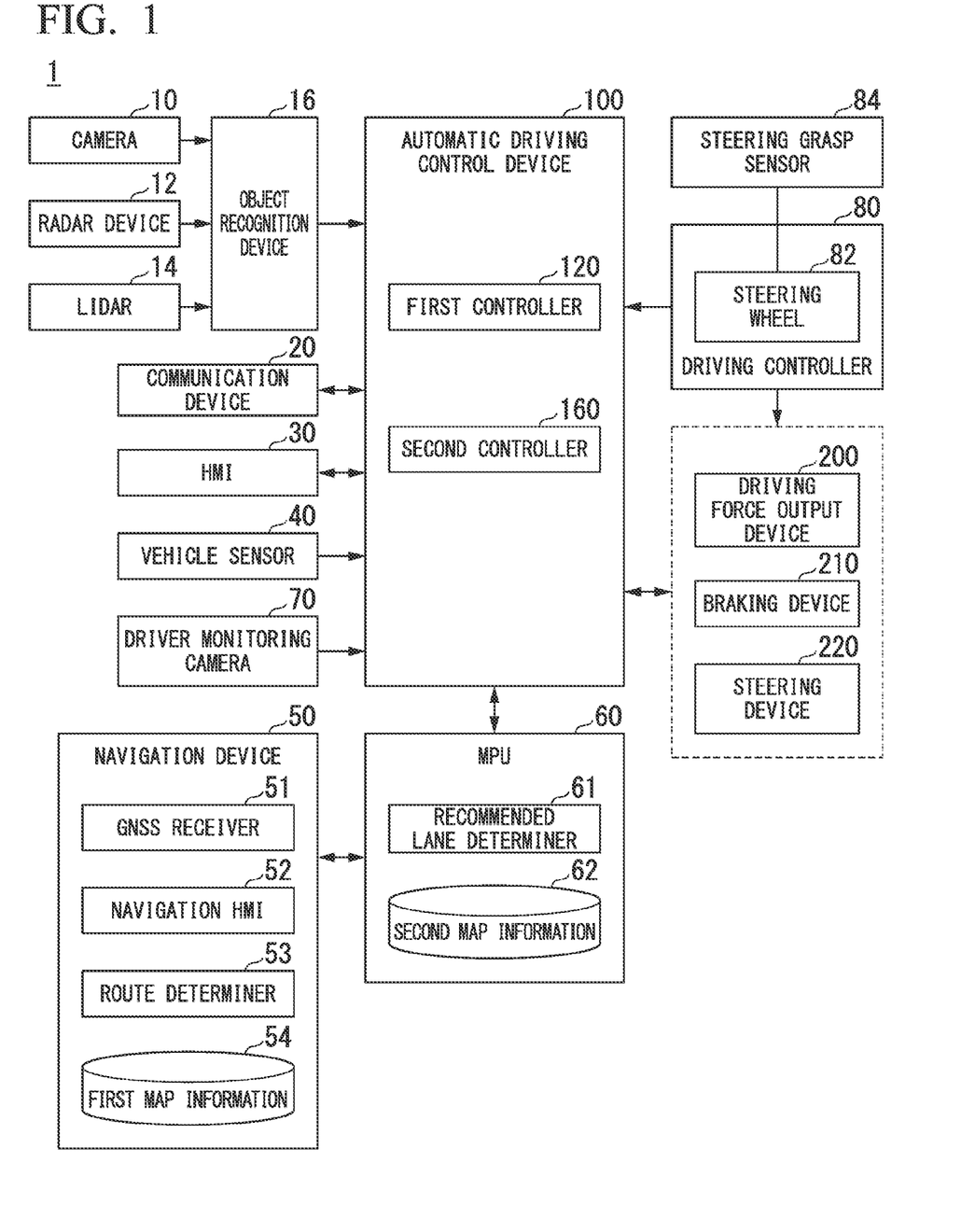
FIG. 1 is a configuration diagram of a vehicle system that uses a vehicle control device according to an embodiment.

FIG. 1 is a configuration diagram of a vehicle system 1 that uses a vehicle control device according to a first embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driving controller 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "subject vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the subject vehicle M periodically, for example. The camera 10 may be a stereo camera.

The radar device 12 radiates a radio wave such as a millimeter wave toward the surroundings of the subject vehicle M, and detects a radio wave (reflected wave) reflected by an object, to detect at least the position (distance and direction) of the object. The radar device 12 is mounted on any part of the subject vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the subject vehicle M, and measures diffused light. The LIDAR 14 detects a distance to a target based on a period of time since emission of light until reception of light. The light to be radiated is, for example, pulsed laser light. The LIDAR 14 is mounted on any part of the subject vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the subject vehicle M or communicate with various kinds of server devices via a radio base station.

The HMI 30 presents various kinds of information to an occupant of the subject vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the subject vehicle M, an acceleration sensor that detects an acceleration, a yaw rate sensor that detects an angular speed with respect to a vertical axis, and an orientation sensor that detects an orientation of the subject vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the subject vehicle M based on a signal received from a GNSS satellite. The position of the subject vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the subject vehicle M identified by the GNSS receiver 51 to a destination input by the occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the subject vehicle M is to travel. When there is a junction on a map route, the recommended lane determiner 61 determines a recommended route so that the subject vehicle M can travel on a route for efficiently entering the junction.

The second map information 62 is map information having higher precision than that of the first map information 54. The second map information 62 includes, for example, information on the center of a lane or information on the boundary of a lane. The second map information 62 may include, for example, road information, traffic regulation information, address information (address or postal code), facility information, phone number information, and information on a prohibition section in which a mode A or B described later is prohibited. The second map information 62 may be updated appropriately through communication between the communication device 20 and another device.

A driver monitor camera 70 is, for example, a digital camera that uses a solid image pickup device such as a CCD or a CMOS. The driver monitor camera 70 is mounted on any part of the subject vehicle M at a position and in a direction so as to be capable of picking up a front image of a head of an occupant (hereinafter referred to as "driver") sitting on a driver seat of the subject vehicle M (in the direction of picking up an image of the face). For example, the driver monitor camera 70 is mounted on an upper part of a display device provided on the center of an instrumental panel of the subject vehicle M.

The driving operator 80 includes, for example, an acceleration pedal, a brake pedal, a gear shift, and other operators in addition to the steering wheel 82. A sensor that detects an operation amount or whether an operation is applied is mounted on the driving controller 80, and the detection result is output to the automatic driving control device 100 or a part or all of the driving force output device 200, the braking device 210, and the steering device 220. The steering wheel 82 is an example of a "controller that receives a steering operation performed by a driver". The operator is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100. The automatic driving control device 100 is an example of "vehicle control device", and a combination of an action plan generator 140 and a second controller 160 is an example of "drive controller".

Figure 2:
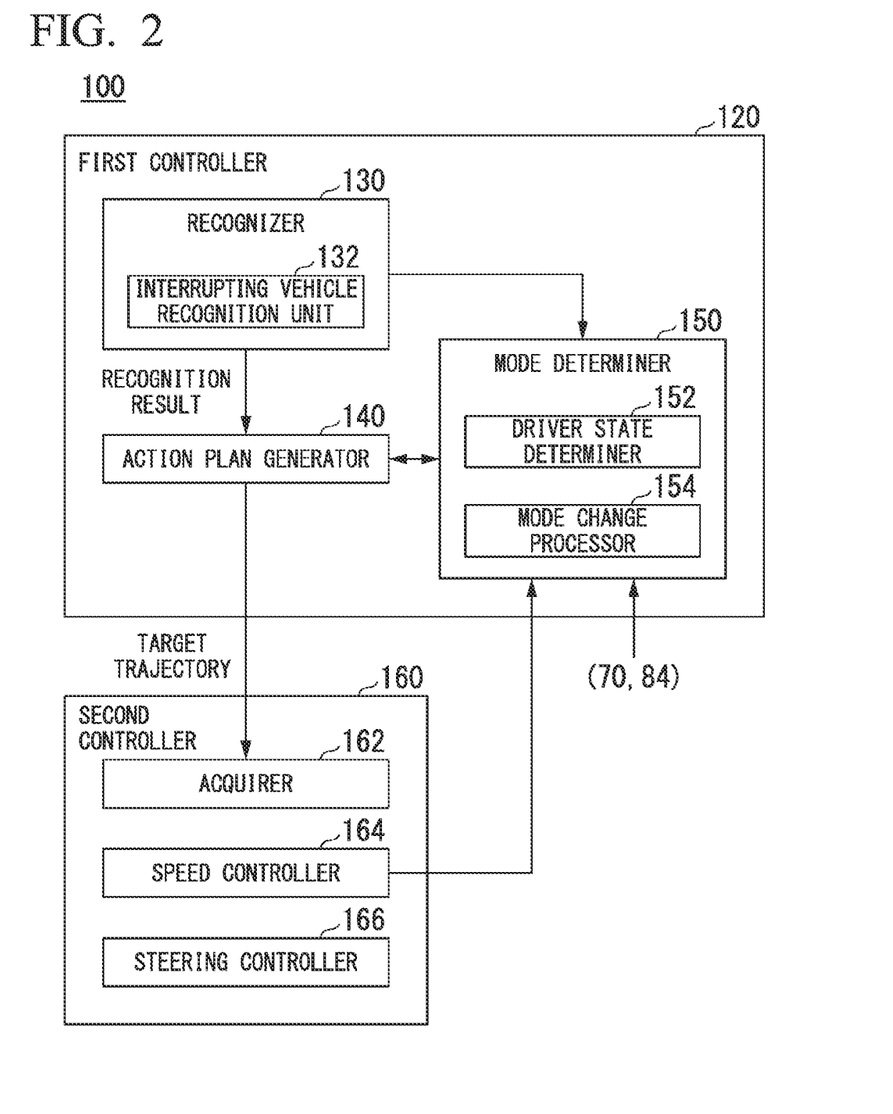
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation In this manner, the reliability of automatic driving is assured.

The recognizer 130 recognizes states such as the position, speed, and acceleration of an object near the subject vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the subject vehicle M to be used for control. The position of an object may be represented by a representative point such as a center of gravity or corner of the object, or may be represented by a region. The "state" of an object may include the acceleration, jerk, or "action state" (for example, whether or not the subject vehicle M is changing a lane or is trying to change a lane) of the object.

The recognizer 130 recognizes, for example, a lane (traveling lane) on which the subject vehicle M is traveling. For example, the recognizer 130 recognizes the traveling lane by comparing a pattern (for example, arrangement of solid lines and broken lines) of a road marking line obtained from the second map information 62 with a pattern of a road marking line near the subject vehicle M recognized from the image photographed by the camera 10, to thereby recognize the traveling lane. In addition to the road marking line, the recognizer 130 may recognize the traveling lane by recognizing a traveling path boundary (road boundary) including, for example, a road marking line, the shoulder of a road, a curb, a center median, and a guardrail. The traveling lane may be recognized in consideration of the position of the subject vehicle M acquired from the navigation device 50 or the result of processing by the INS. The recognizer 130 recognizes a stop line, an obstacle, red light, a toll gate, and other road events.

The recognizer 130 recognizes the position or posture of the subject vehicle M with respect to a traveling lane when recognizing the traveling lane. The recognizer 130 may recognize, for example, as the relative position and posture of the subject vehicle M with respect to the traveling lane, a deviation of the reference point of the subject vehicle M from the center of the lane and an angle with respect to a line obtained by connecting the centers of the lane in the traveling direction of the subject vehicle M. Instead, the recognizer 130 may recognize, for example, the position of the reference point of the subject vehicle M with respect to any side edge (road marking line or road boundary) of the traveling lane as the relative position of the subject vehicle M with respect to the traveling lane.

The recognizer 130 includes an interrupting vehicle recognizer 132. The interrupting vehicle recognizer 132 recognizes an interrupting vehicle that is a vehicle trying to cut in a lane (hereinafter referred to as "subject lane") on which the subject vehicle M is traveling. An example of the interrupting vehicle cutting in the subject lane is a scene in which the subject vehicle M is traveling on a main lane and then another vehicle traveling on an adjacent lane changes lanes due to decrease in number of lanes. Through change of lanes, another vehicle inevitably enters the subject lane, and thus the interrupting vehicle recognizer 132 recognizes, as the interrupting vehicle, another vehicle existing in a predetermined range with respect to the subject vehicle M. Various kinds of techniques are considered for the processing of recognizing an interrupting vehicle. Further, the interrupting vehicle recognizer 132 derives an indicator value for quantifying a collision risk (or interruption risk) between the subject vehicle M and another vehicle. The indicator value includes, for example, the distance between the subject vehicle and another vehicle, the distance between the center of the subject lane and the center of another vehicle, the speeds of the subject vehicle and another vehicle, the time to collision (TTC) between the subject vehicle and another vehicle, and the time headway (THW) between the subject vehicle M and another vehicle. TTC means, for example, a time until the subject vehicle M reaches a reference position (for example, edge closest to subject vehicle M) of another vehicle. Further, THW means a time since another vehicle has passed through a predetermined position until the subject vehicle M passes through the predetermined position. TTC can be calculated by TTC=fd/rv, where fd is the distance between the subject vehicle M and another vehicle in the direction of road travel and rv is the relative speed between the subject vehicle M and another vehicle in the direction of road travel. Furthermore, THW can be calculated by THW=fd/v, where v is the speed of the subject vehicle M in the direction of road travel. Alternatively, one or both of TTC and THW may be calculated based on velocity, relative speed, and distance taking the road width direction into consideration.

The action plan generator 140 generates a target trajectory on which the subject vehicle M is to travel in the future (irrespective of the operation of the driver) automatically so as to be capable of traveling on a recommended lane determined by the recommended lane determiner 61 in principle, and coping with the surrounding situation of the subject vehicle M. The target trajectory includes, for example, a speed component. For example, the target trajectory is represented as an arrangement of points (trajectory points) the subject vehicle M is assumed to pass through. The trajectory points are points to be passed through by the subject vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be passed through by the subject vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the subject vehicle M as one of a plurality of driving modes having different tasks imposed on a driver. The mode determiner 150 includes, for example, a driver state determiner 152 and a mode change processor 154. The functions of these components are described later.

Figure 3:
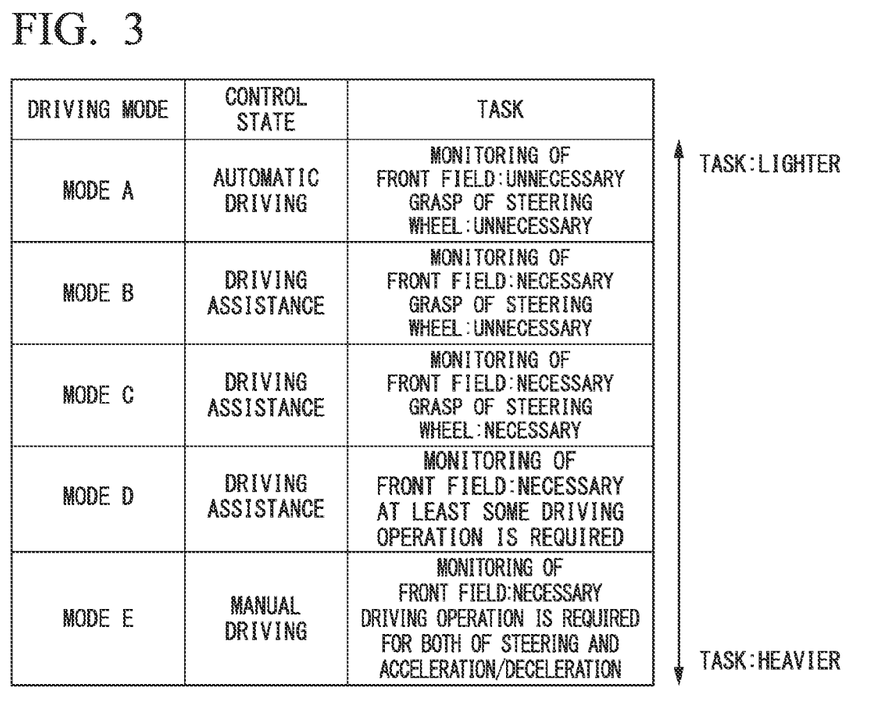
FIG. 3 is a diagram illustrating an example of a correspondence relationship among a driving mode, a control state of a subject vehicle, and a task.

FIG. 3 is a diagram illustrating an example of a correspondence relationship among a driving mode, a control state of the subject vehicle M, and a task. The driving mode of the subject vehicle M includes, for example, five modes, namely, a mode A to a mode E. The control state, namely, the degree of automatic driving control of the subject vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and cause the driving mode to transition to driving assistance or manual driving. Now, examples of details of the respective driving modes are given in the following. The mode A and/or B is an example of "second driving mode", and a part or all of the mode C, mode D, and mode E is an example of "first driving mode". The first driving mode is a driving mode in which the driver is tasked with monitoring the surroundings of the subject vehicle M. The second driving mode is a driving mode in which the driver is not tasked with monitoring the surroundings of the subject vehicle.

The mode A relates to the state of automatic driving, and the driver does not bear any one of the tasks of monitoring the front field of view and grasping the steering wheel 82. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the traveling direction of the host vehicle M visually recognized through a front wind shield. The mode A is a driving mode that can be executed, for example, when the host vehicle M is traveling at a speed equal to or lower than the upper limit vehicle speed (for example, about 50 [km/h]) on an expressway such as a highway, and there is a preceding vehicle for the host vehicle M to follow, which is sometimes referred to as TJP (Traffic Jam Pilot). When this condition is not satisfied, the mode determiner 150 changes the driving mode of the host vehicle M to the mode B.

The mode B relates to the state of driving assistance, and the driver bears the task of monitoring the front field of view of the host vehicle M, but does not have the task of grasping the steering wheel 82. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the host vehicle M. For example, in the mode D, driving assistance such as ACC (Adaptive Cruise Control) or LKAS (Lane Keeping Assist System) is performed. The mode E refers to the state of manual driving in which the driver is required to perform a driving operation for both of steering and acceleration/deceleration. In both of the mode D and the mode E, the driver naturally bears the task of monitoring the front field of view of the host vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the own vehicle by a reference amount or more, and an automatic lane change (automatic lane change caused by change of recommended lane) for traveling toward the destination. The automatic lane change (2) is to change the lane of the host vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, none of the automatic lane change (1) and the automatic lane change (2) is not executed.

When the task of the determined driving mode (hereinafter referred to as "current driving mode") is not performed by the driver, the mode determiner 150 changes the driving mode of the host vehicle M to a driving mode that imposes a heavier task. The mode determiner 150 may restrict execution of the second driving mode when the task of the current driving mode is not performed by the driver. The phrase "restrict execution of the second driving mode" means, for example, changing the second driving mode to the first driving mode imposing a larger task on the occupant than the second driving mode. Further, in addition to the above change, the phrase "restrict execution of the second driving mode" means stopping or reducing a part of the function of the current driving mode without changing the current driving mode. For example, when the mode A is restricted, it is conceivable to basically remove the necessity to monitor the front field of view and grasp the steering wheel, and execute driving assistance temporarily by temporarily requesting monitoring of the front field of view and grasp of the steering wheel when the vehicle M is traveling near a traffic light OB1.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the own vehicle M to gradually stop at the shoulder of the road and stopping automatic driving. After automatic driving is stopped, the own vehicle M is set to the state of the mode D or the mode E, and the own vehicle M can be caused to start by a manual operation performed by the driver. The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the own vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the own vehicle M to gradually stop at the shoulder of the road and stopping automatic driving.

The driver state determiner 152 monitors the state of the driver and determines whether the state of the driver is a state that accords with a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 instructs the action plan generator 140 to generate a target trajectory for stopping at the shoulder, gives an activation instruction to the driving assistance device (not shown), or controls the HMI to prompt the driver to perform an action.

The second controller 160 controls the driving force output device 200, the braking device 210, and the steering device 220 so that the host vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the host vehicle M and feedback control based on a deviation from the target trajectory.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving operator 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving operator 80, and causes a brake torque that depends on a braking operation to be output to each wheel. The braking device 210 may include, as a backup, a mechanism for transmitting the hydraulic pressure, which is caused by an operation of the brake pedal included in the driving operator 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving operator 80 to change the orientation of the steered wheel.

[Control in Interruption]

Now, description is given of control in interruption to be executed by the interrupting vehicle recognizer 132 and the mode change processor 154. This control is executed when the subject vehicle M is traveling in one of the mode A or B.

Figure 4:
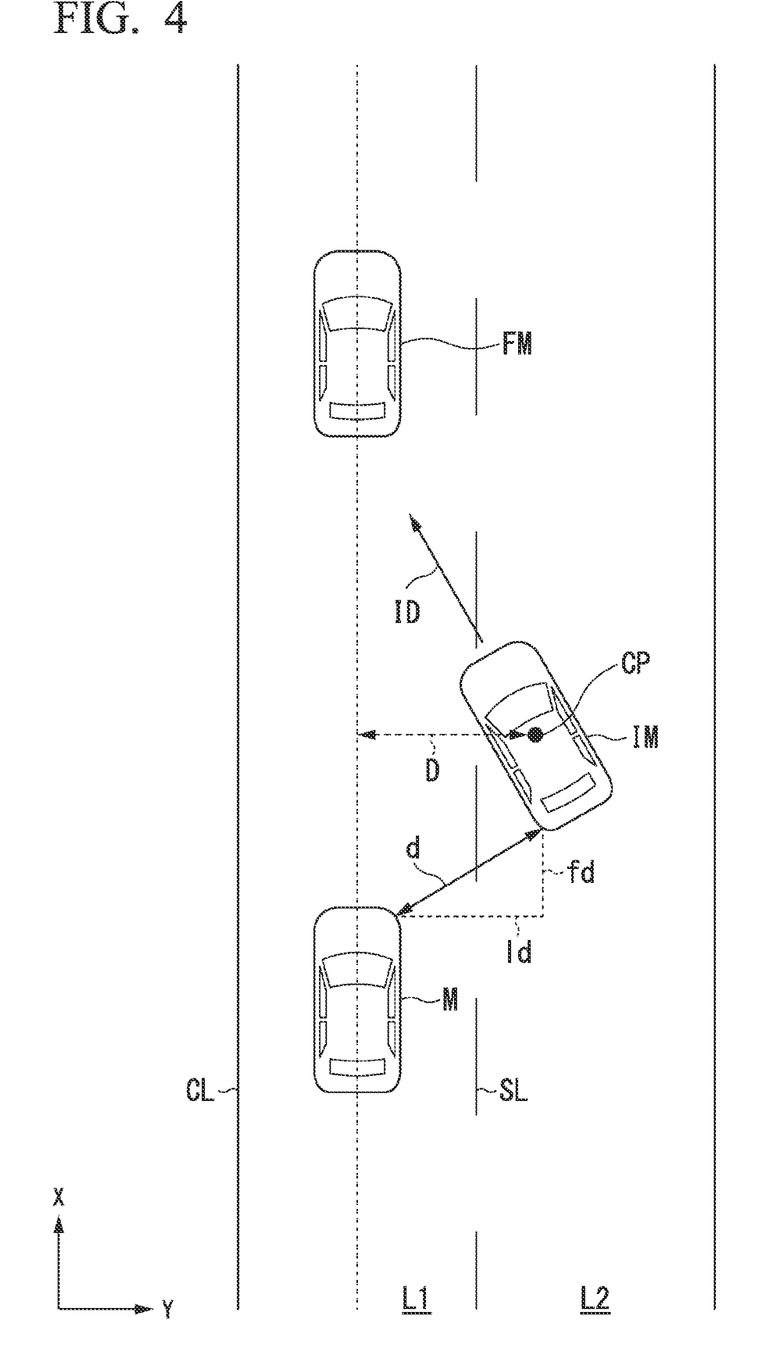
FIG. 4 is a diagram illustrating a situation in which an interrupting vehicle is recognized in a lane change scene.

FIG. 4 is a diagram illustrating a situation in which an interrupting vehicle is recognized in a lane change scene. In FIG. 4, a road extension direction is represented by an X direction, and a road width direction is represented by a Y direction. In this scene, a preceding vehicle FM is traveling in front of the subject vehicle M traveling along the subject lane L1 in the X direction, and another vehicle IM traveling along a lane L2 in the X direction is trying to change lanes in an interruption direction ID. At this time, the interrupting vehicle recognizer 132 recognizes another vehicle IM existing in a predetermined range from the subject vehicle M as an interrupting vehicle. The interrupting vehicle recognizer 132 further calculates a distance d between the center CL of the subject lane L1 and the center CP of another vehicle IM, and a distance d between the subject vehicle M and another vehicle IM. The distance d in this case represents a distance between the point of the subject vehicle M and the point of another vehicle IM that takes a minimum value when the subject vehicle M and another vehicle IM are considered to be points on the XY plane. The interrupting vehicle recognizer 132 calculates a distance fd in the X direction from the distance d, and as described above, calculates a TTC between the subject vehicle M and another vehicle IM.

The mode determiner 150 changes the driving mode from the mode A or B to the mode D or E when one or more of first to fourth conditions described below are satisfied. These conditions are conditions indicating that influence of interruption by another vehicle IM is large at the time of interruption. The recognizer 130 may change the backward and lateral distances of the monitoring range between the surrounding situation recognized for use in traveling of the subject vehicle M and the surrounding situation recognized for identifying the interrupting vehicle.

(First Condition)

The first condition is that the TTC between the subject vehicle M and another vehicle IM is equal to or shorter than a first threshold value and a distance D between the center CK of the subject lane L1 and the center CP of another vehicle IM is equal to or smaller than a second threshold value. The first threshold value is, for example, 1 to several seconds of time [sec], and the second threshold value is, for example, several meters [m]. That is, the mode determiner 150 changes the driving mode when determining that the subject vehicle M and another vehicle IM approach each other and a time to collision becomes shorter. As a result, the driver of the subject vehicle M can be tasked with the surrounding situation monitoring task or driving operation task at an appropriate timing, and it is possible to perform appropriate control according to the situation at the time of interruption.

(Second Condition)

The second condition is that the TTC between the subject vehicle M and the preceding vehicle FM is equal to or shorter than the first threshold value. Control of the first condition is executed for the subject vehicle M and another vehicle IM trying to cut in the lane, whereas control of the second condition is executed for the subject vehicle M and the preceding vehicle FM that the subject vehicle M is controlled to follow, for example. The mode determiner 150 changes the driving mode when determining that the time to collision between the subject vehicle M and another vehicle IM or preceding vehicle FM is short. As a result, the driver of the subject vehicle M can be tasked with the surrounding situation monitoring task or driving operation task at an appropriate timing, and it is possible to perform appropriate control in broader scenes in addition to the situation of interruption.

Further, in the above control, the mode determiner 150 performs determination by using the TTC between the subject vehicle M and another vehicle IM and the distance D between the center CL of the subject lane L1 and the center CP of another vehicle IM. The mode determiner 150 can perform similar determination by using the THW between the subject vehicle M and another vehicle IM instead of the TTC, or by using a distance ld that is a Y-directional component of the distance d or a Y-directional component of the distance between the center of the subject vehicle M and the center CP of another vehicle IM.

(Third Condition)

Figure 5:
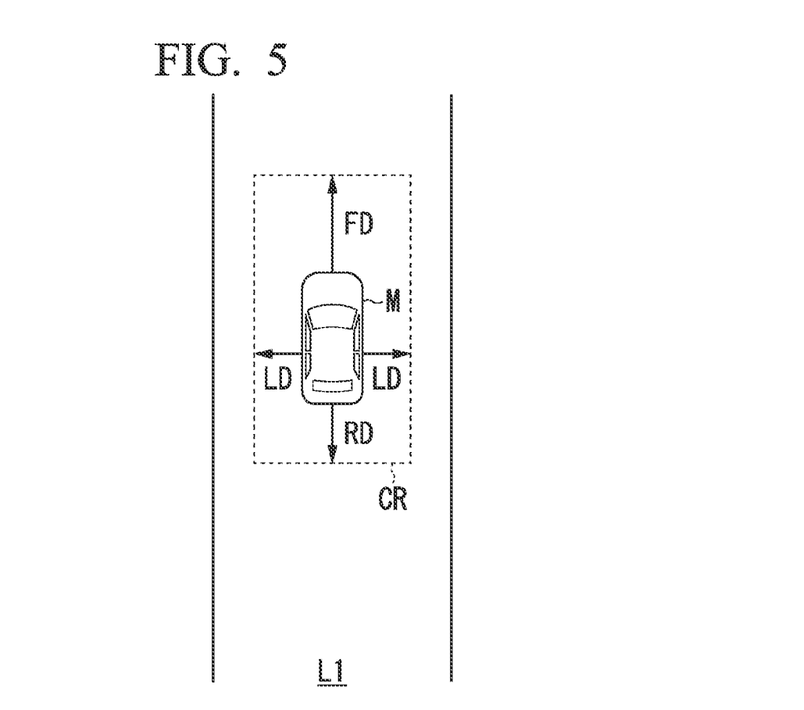
FIG. 5 is a diagram illustrating an example of an excessively close region for determining interruption in one lane.
Figure 6:
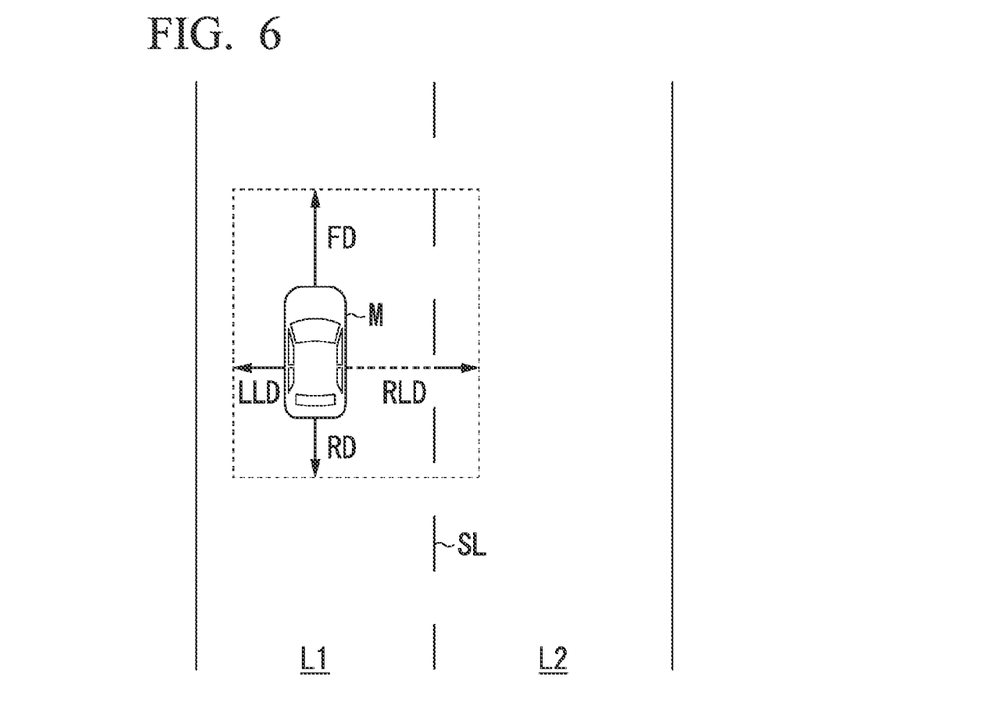
FIG. 6 is a diagram illustrating an example of an excessively close region for determining interruption in two lanes.

Next, description is given of an excessively close region CR for determining interruption with reference to FIG. 5 and FIG. 6. FIG. 5 is a diagram illustrating an example of an excessively close region for determining interruption in one lane. In FIG. 5, FD represents a threshold value (hereinafter referred to as "third threshold value") relating to a forward distance from the subject vehicle M, which is set with respect to the front end of the subject vehicle M, RD represents a threshold value (hereinafter referred to as "fourth threshold value") relating to a backward distance from the subject vehicle M, which is set with respect to the back end of the subject vehicle M, and LD represents a threshold value (hereinafter referred to as "fifth threshold value") relating to a lateral distance from the subject vehicle M, which is set with respect to the left and right lateral ends of the subject vehicle M. The excessively close region CR is a rectangular region obtained by extending from the front end of the subject vehicle M by the third threshold value FD, extending from the back end of the subject vehicle M by the fourth threshold value RD, and extending from the left and right lateral ends of the subject vehicle M by the fifth threshold value LD. The third threshold value FD is, for example, a distance of several meters [m], the fourth threshold value RD is, for example, a distance of less than one meter [m], and the fifth threshold value LD is, for example, a distance of less than one meter [m].

The third condition is that at least one of the following conditions is satisfied: a condition that the forward distance between the subject vehicle M and another vehicle IM is equal to or smaller than the third threshold value FD; a condition that the backward distance between the subject vehicle M and another vehicle IM is equal to or smaller than the fourth threshold value RD; and a condition that a lateral distance between the subject vehicle M and another vehicle IM is equal to or smaller than the fifth threshold value LD. That is, the mode determiner 150 changes the driving mode when determining that the subject vehicle M and another vehicle IM approach each other and there is a risk of collision. As a result, the driver of the subject vehicle M can be tasked with the surrounding situation monitoring task or driving operation task at an appropriate timing, and it is possible to perform appropriate control in broader scenes in addition to the situation of interruption. As a result, the driver of the subject vehicle M can be tasked with the surrounding situation monitoring task or driving operation task at an appropriate timing, and it is possible to perform appropriate control according to the situation of interruption.

(Fourth Condition)

FIG. 6 is a diagram illustrating an example of an excessively close region for determining interruption in two lanes. In FIG. 6, FD represents a threshold value (third threshold value) relating to a forward distance from the subject vehicle M, which is set with respect to the front end of the subject vehicle M, RD represents a threshold value (fourth threshold value) relating to a backward distance from the subject vehicle M, which is set with respect to the back end of the subject vehicle M, LLD represents a threshold value (fifth threshold value) relating to a left distance from the subject vehicle M, which is set with respect to the left end of the subject vehicle M, and RLD represents a threshold value (hereinafter referred to as "sixth threshold value") relating to a right distance from the subject vehicle M, which is set to exceed a road marking line SL and reach an adjacent lane. That is, the sixth threshold value is a sum of a distance from the subject vehicle M to the road marking line SL and an excessive closeness determination distance set to exceed the road marking line SL and reach the adjacent lane. The excessively close region CR is a rectangular region obtained by extending from the front end of the subject vehicle M by the third threshold value FD, extending from the back end of the subject vehicle M by the fourth threshold value RD, extending from the left end of the subject vehicle M by the fifth threshold value LLD, and extending from the right end of the subject vehicle M by the sixth threshold value RLD. In FIG. 6, there is a lane L2 on which another vehicle IM is traveling on the right lateral side of the subject vehicle M, and thus the sixth threshold value RLD is set to be larger than the fifth threshold value LLD. The sixth threshold value RLD is set to be a distance smaller than 1 [m], for example.

The fourth condition is that at least one of the following conditions is satisfied: a condition that the forward distance between the subject vehicle M and another vehicle IM is equal to or smaller than the third threshold value FD; a condition that the backward distance between the subject vehicle M and another vehicle IM is equal to or smaller than the fourth threshold value RD; a condition that a left lateral distance between the subject vehicle M and another vehicle IM is equal to or smaller than the fifth threshold value LLD; and a condition that a lateral distance between the subject vehicle M and another vehicle IM, which is set to exceed the road marking line SL and reach the adjacent lane, is equal to or smaller than the sixth threshold value. That is, the mode determiner 150 changes the driving mode when determining that the subject vehicle M and the another vehicle IM approach each other and there is a risk of collision. As a result, the driver of the subject vehicle M can be tasked with the surrounding situation monitoring task or driving operation task at an appropriate timing, and it is possible to perform appropriate control according to the situation of interruption. Further, contrary to the case of FIG. the sixth threshold value, which relates to a road marking line side more likely to incur interruption from another vehicle IM, is set to be larger than the fifth threshold value, to thereby perform more appropriate control according to the situation of interruption. In FIG. 6, description is given of a case in which there is a road marking line on the right side of the subject vehicle M more likely to incur interruption from another vehicle IM, but also when there is a road marking line on the left side of the subject vehicle M more likely to incur interruption from another vehicle IM, it is possible to perform control using the sixth threshold value. For example, when the subject vehicle M is traveling on a road with three or more lanes, it is possible to perform control using the sixth threshold value for both of the right side and the left side of the subject vehicle M.

Regarding the processing of FIG. 5 and FIG. 6, description has been given of the case of changing the driving mode when detecting another vehicle IM in the excessively close region CR. However, the present invention is not limited to this configuration, and the driving mode may be changed when an edge of a certain object is detected in the excessively close region CR in general. Further, the driving mode may be changed not when another vehicle IM is detected but when the state of detecting another vehicle IM has continued for a certain period (for example, several seconds [sec]).

Further, in the description given above, the condition of FIG. 5 is applied to the case where the subject vehicle M is traveling on a road with one lane, and the condition of FIG. 6 is applied to the case where the subject vehicle M is traveling on a road with two or more lanes. However, the present invention is not limited to this configuration, and the condition of FIG. 5 and the condition of FIG. 6 may be combined. Specifically, for example, while the subject vehicle M is traveling on a road with two lanes, the condition of FIG. 5 may be applied when there is no another vehicle IM near the subject vehicle M, whereas the condition of FIG. 6 may be applied when there is another vehicle IM near the subject vehicle M.

Figure 7:
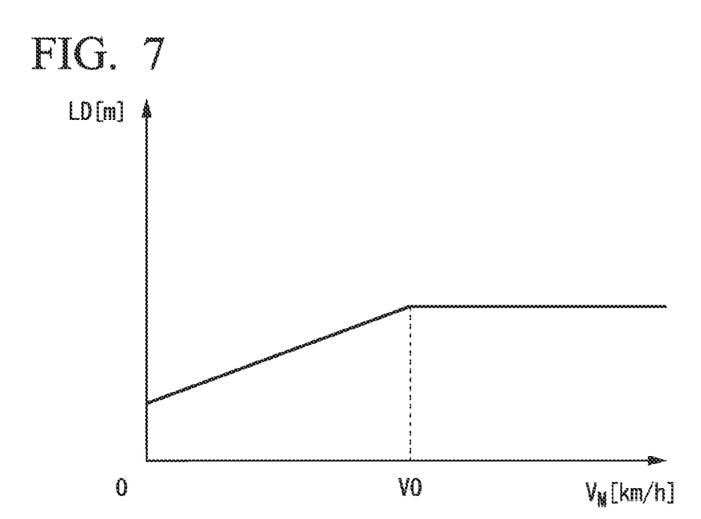
FIG. 7 is a diagram illustrating a relationship between the speed of a subject vehicle M and the value of a fifth threshold value LD.

Next, description is given of the setting of the fifth threshold value LD according to the speed with reference to FIG. 7. FIG. 7 is a diagram illustrating a relationship between the speed of the subject vehicle M and the value of the fifth threshold value LD. As illustrated in FIG. 7, the mode determiner 150 increases the fifth threshold value LD as the speed of the subject vehicle M becomes larger. This is because as the speed of the subject vehicle M becomes larger, the influence of interruption also becomes larger, resulting in a necessity to set the excessively close region CR widely. FIG. 7 illustrates a relationship for the fifth threshold value LD, but the same holds true for the sixth threshold value RLD, and the mode determiner 150 increase the sixth threshold value RLD as the speed of the subject vehicle M becomes larger. As a result, it is possible to execute safer control according to the speed of the subject vehicle M. Further, in addition to increase of the fifth threshold value LD or the sixth threshold value RLD, the above condition may specify that the third threshold value FD and fourth threshold value RD be increased as the speed of the subject vehicle M becomes larger.

FIG. 7 illustrates an example in which the value of the fifth threshold value LD increases linearly from an initial value at a speed zero, and takes a constant value after the speed V0. However, the mode of increase in value of the fifth threshold value LD is not limited thereto, and the value of the fifth threshold value LD may increase in a curved manner or stepwise manner, for example.

Figure 8:
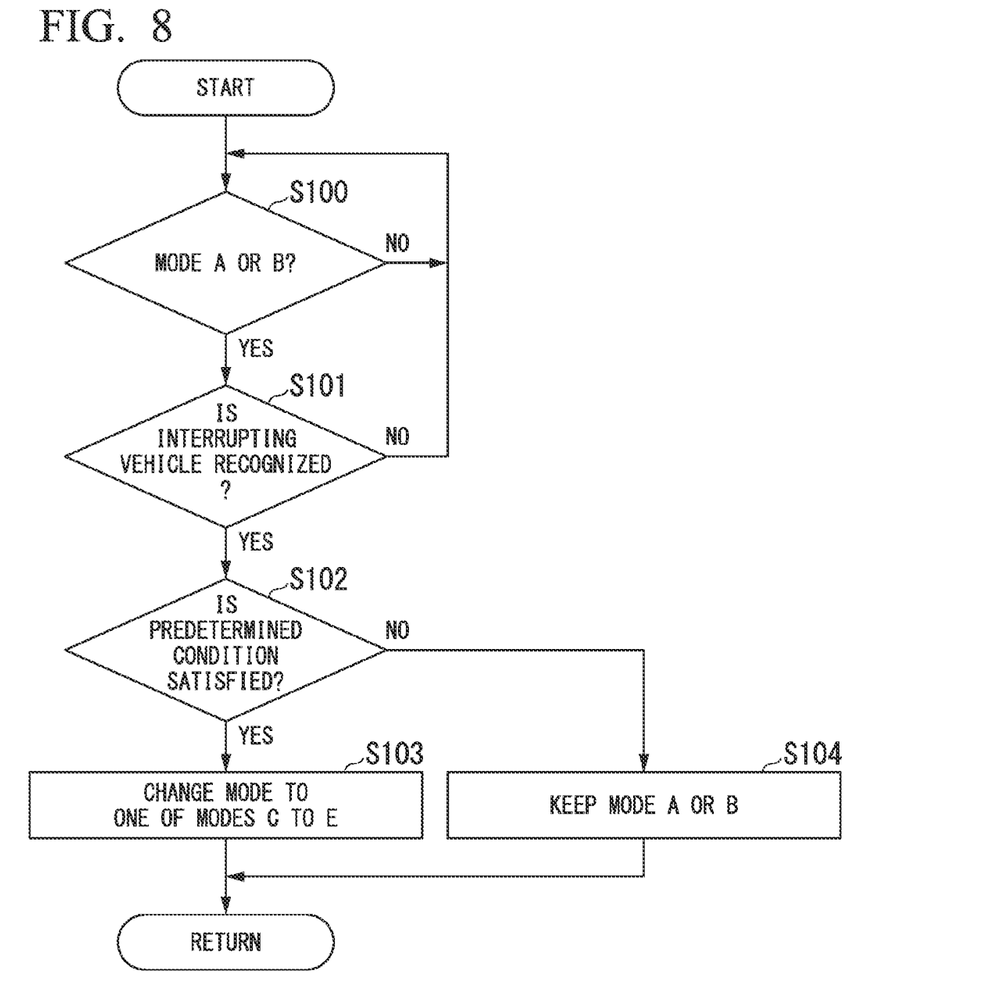
FIG. 8 is a flow chart illustrating an example of a flow of processing to be executed by a recognizer 130 and a mode determiner 150.

Next, description is given of processing to be executed by the recognizer 130 and the mode determiner 150 with reference to FIG. 8. FIG. 8 is a flow chart illustrating an example of a flow of processing to be executed by the recognizer 130 and the mode determiner 150.

First, the mode determiner 150 determines whether or not the current driving mode of the subject vehicle M is the mode A or B (Step S100). When the current driving mode of the subject vehicle M is not the mode A or B, the mode determiner 150 repeats the determination of Step S100.

When it is determined that the current driving mode of the subject vehicle M is the mode A or B, the recognizer 130 determines whether or not an interrupting vehicle is recognized (Step S101). When it is determined that an interrupting vehicle is not recognized, the recognizer 130 returns the processing to Step S101.

When it is determined that an interrupting vehicle is recognized, the mode determiner 150 determines whether a predetermined condition, that is, one of a first condition, a second condition, a third condition, and a fourth condition, which indicate that the influence of interruption is large, is satisfied (Step S102). When it is determined that one of the first condition, the second condition, the third condition, and the fourth condition is satisfied, the mode determiner 150 changes the driving mode of the subject vehicle M to one of the modes C, D, and E (Step S103). On the other hand, when it is determined that none of the first condition, the second condition, the third condition, and the fourth condition is satisfied, the mode determiner 150 continues the driving mode A or B of the subject vehicle M (Step S104).

According to the embodiment described above, the recognizer 130 recognizes an interrupting vehicle, and the mode determiner 150 changes the driving mode when a condition indicating that influence of interruption is large is satisfied, so that the driver of the subject vehicle M is tasked with the surrounding situation monitoring task or driving operation task at an appropriate timing. In other words, it is possible to perform appropriate control according to the situation of interruption.

The above-mentioned embodiment can be expressed in the following manner.

A vehicle control device including a storage device having stored thereon a program and a hardware processor, the hardware processor executing the program to:
  recognize a surrounding situation of a vehicle, and identify an interrupting vehicle trying to cut in a lane of the vehicle;
  control steering and acceleration/deceleration of the vehicle without depending on an operation of the vehicle by a driver; and
  determine a driving mode of the vehicle as one of a plurality of driving modes including a first driving mode and a second driving mode,
  the second driving mode being a driving mode imposing a lighter task on the driver than the first driving mode, and a part of the plurality of driving modes including at least the second driving mode being controlled by the driving controller, and
  the mode determiner restricting execution of the second driving mode when a relationship between the vehicle and the interrupting vehicle satisfies a predetermined condition.

This concludes the description of the embodiment for carrying out the present invention. The present invention is not limited to the embodiment in any manner, and various kinds of modifications and replacements can be made within a range that does not depart from the gist of the present invention. For example, the present invention can be applied to power conversion equipment and grids, which can be connected to commercial power systems.

What is claimed is:

1. A vehicle control device comprising:
  a recognizer that recognizes a surrounding situation of a vehicle, and identifies an interrupting vehicle trying to cut in a lane of the vehicle;
  a driving controller that controls steering and acceleration/deceleration of the vehicle without depending on an operation of the vehicle by a driver; and
  a mode determiner that determines a driving mode of the vehicle as one of a plurality of driving modes including a first driving mode and a second driving mode,
  wherein the second driving mode is a driving mode imposing a lighter task on the driver than the first driving mode, and a part of the plurality of driving modes including at least the second driving mode is controlled by the driving controller, wherein the mode determiner restricts execution of the second driving mode when a relationship between the vehicle and the interrupting vehicle satisfies a predetermined condition, and wherein the predetermined condition includes a condition that a time to collision between the vehicle and the interrupting vehicle is equal to or shorter than a first threshold value, and a distance between a center of the lane and a center of the interrupting vehicle is equal to or smaller than a second threshold value.

2. The vehicle control device according to claim 1, wherein the second driving mode is a driving mode in which the driver is not required to perform a task of grasping a controller for receiving a steering operation, and wherein the first driving mode is a driving mode in which the driver is required to perform a driving operation for at least one of steering and acceleration/deceleration of the vehicle.

3. The vehicle control device according to claim 1, wherein the second driving mode is a driving mode in which the driver is not required to perform a task of grasping a controller for receiving a steering operation, and wherein the first driving mode is a driving mode in which the driver is required to perform at least the task of grasping the controller for receiving a steering operation.

4. The vehicle control device according to claim 1, wherein the first driving mode is a driving mode in which the driver is required to perform a task of monitoring the surrounding situation of the vehicle, and wherein the second driving mode is a driving mode in which the driver is not required to perform the task of monitoring the surrounding situation of the vehicle.

5. The vehicle control device according to claim 1, wherein the recognizer changes a backward distance and a lateral distance to be monitored between the surrounding situation recognized for traveling of the vehicle and the surrounding situation recognized for identifying the interrupting vehicle.

6. The vehicle control device according to claim 1, wherein the predetermined condition includes a condition that at least one of the following is satisfied: a forward distance between the vehicle and the interrupting vehicle is equal to or smaller than a third threshold value; a backward distance between the vehicle and the interrupting vehicle is equal to or smaller than a fourth threshold value; and a lateral distance between the vehicle and the interrupting vehicle is equal to or smaller than a fifth threshold value.

7. The vehicle control device according to claim 6, wherein the mode determiner increases the fifth threshold value as a speed of the vehicle becomes larger.

8. The vehicle control device according to claim 7, wherein the mode determiner increases the third threshold value or the fourth threshold value as the speed of the vehicle becomes larger.

9. The vehicle control device according to claim 1, wherein the predetermined condition includes a condition that at least one of the following is satisfied: a forward distance between the vehicle and the interrupting vehicle is equal to or smaller than a third threshold value; a backward distance between the vehicle and the interrupting vehicle is equal to or smaller than a fourth threshold value; and a lateral distance between the vehicle and the interrupting vehicle is equal to or smaller than a sixth threshold value, the sixth threshold value being set to exceed a road marking line of the lane and reach an adjacent lane.

10. The vehicle control device according to claim 9, wherein the mode determiner increases the sixth threshold value as a speed of the vehicle becomes larger.

11. A vehicle control method to be executed by a computer mounted in a vehicle, the vehicle control method comprising:

recognizing a surrounding situation of the vehicle, and identifying an interrupting vehicle trying to cut in a lane of the vehicle;

controlling steering and acceleration/deceleration of the vehicle without depending on an operation of the vehicle by a driver; and determining a driving mode of the vehicle as one of a plurality of driving modes including a first driving mode and a second driving mode, wherein the second driving mode is a driving mode imposing a lighter task on the driver than the first driving mode, and a part of the plurality of driving modes including at least the second driving mode is controlled by the controlling, wherein the vehicle control method further comprises restricting execution of the second driving mode when a relationship between the vehicle and the interrupting vehicle satisfies a predetermined condition, and wherein the predetermined condition includes a condition that a time to collision between the vehicle and the interrupting vehicle is equal to or shorter than a first threshold value, and a distance between a center of the lane and a center of the interrupting vehicle is equal to or smaller than a second threshold value.

12. A non-transitory computer readable storage medium storing a program for causing a computer mounted in a vehicle to execute:

recognizing a surrounding situation of the vehicle, and identifying an interrupting vehicle trying to cut in a lane of the vehicle;

controlling steering and acceleration/deceleration of the vehicle without depending on an operation of the vehicle by a driver; and determining a driving mode of the vehicle as one of a plurality of driving modes including a first driving mode and a second driving mode, wherein the second driving mode is a driving mode imposing a lighter task on the driver than the first driving mode, and a part of the plurality of driving modes including at least the second driving mode is controlled by the controlling, wherein the program further causes the computer to execute restricting execution of the second driving mode when a relationship between the vehicle and the interrupting vehicle satisfies a predetermined condition, and wherein the predetermined condition includes a condition that a time to collision between the vehicle and the interrupting vehicle is equal to or shorter than a first threshold value, and a distance between a center of the lane and a center of the interrupting vehicle is equal to or smaller than a second threshold value.

* * * * *